US008333185B1

(12) United States Patent
Gourley

(10) Patent No.: US 8,333,185 B1
(45) Date of Patent: Dec. 18, 2012

(54) SOLAR FLUID HEATER AND APPLICATIONS FOR THE SAME

(75) Inventor: Richard Lecky Gourley, Whiritoa (NZ)

(73) Assignee: S.P.U.D. Ltd., Auckland (NZ)

( * ) Notice: Subject to any disclaimer, the term of this patent is extended or adjusted under 35 U.S.C. 154(b) by 437 days.

(21) Appl. No.: 12/626,255

(22) Filed: Nov. 25, 2009

Related U.S. Application Data

(60) Provisional application No. 61/119,013, filed on Dec. 1, 2008.

(51) Int. Cl.
*F24J 2/00* (2006.01)
(52) U.S. Cl. ........ 126/563; 126/624; 126/666; 126/675; 126/655; 126/634; 126/661; 126/704; 126/658; 126/633; 165/177; 165/76
(58) Field of Classification Search ............. 126/563, 126/624, 666, 675, 651, 655, 634, 661, 704, 126/658, 633, 663; 165/177, 76
See application file for complete search history.

(56) References Cited

U.S. PATENT DOCUMENTS

| | | | | |
|---|---|---|---|---|
| 3,868,945 | A * | 3/1975 | Konopka et al. | 126/563 |
| 3,970,069 | A * | 7/1976 | Pickett | 126/563 |
| 4,164,933 | A | 8/1979 | Alosi | |
| 4,211,213 | A * | 7/1980 | Nissen et al. | 126/563 |
| 4,280,477 | A | 7/1981 | Divine | |
| 4,333,186 | A * | 6/1982 | Lankheet | 4/506 |
| 4,333,448 | A * | 6/1982 | Johnson | 126/714 |
| 4,381,763 | A * | 5/1983 | Kahl | 126/563 |
| 4,470,405 | A * | 9/1984 | Landstrom et al. | 126/701 |
| 4,473,063 | A * | 9/1984 | Mackensen | 126/591 |
| 4,511,618 | A * | 4/1985 | Duchene et al. | 428/215 |
| 4,534,336 | A * | 8/1985 | Ladriere | 126/633 |
| 4,562,884 | A | 1/1986 | Moller et al. | |
| 5,572,988 | A | 11/1996 | Walton | |
| 5,660,164 | A * | 8/1997 | Rodriguez Sanchez | 126/640 |

* cited by examiner

*Primary Examiner* — Steven B McAllister
*Assistant Examiner* — Avinash Savani
(74) *Attorney, Agent, or Firm* — William A. Loginov; Loginov & Associates, PLLC

(57) ABSTRACT

This invention provides a solar fluid heating assembly that generally increases efficiency by reflecting the sun's energy onto heat generating surfaces that face away from the sun. It also provides an aesthetic structure that is readily installed in a variety of outdoor settings and can be used as a boundary fence in certain applications. In an illustrative embodiment, the solar heater comprises one or more conduits and a reflective mechanism, such that in use, heat energy falls onto a front surface of the conduit, thereby heating water or another fluid within the conduit, and heat energy is reflected by the reflective mechanism onto another surface of the conduit, thereby further heating the fluid within the conduit. The assembly can include one or more conduits between a first and a second panel, wherein at least one outwardly facing portion of the first panel is substantially transparent to solar heat energy passing therethrough in the direction of the conduits and at least one portion, typically an inner surface, of the second panel orientated toward the conduits is reflective of solar heat energy. The second panel can be curved or corrugated. This illustrative assembly includes a fluid inlet and a fluid outlet. The assembly can be a standalone unit, or an assembly (fence) of interconnected operative sections. The assembly can be used to heat shower water, among other applications.

14 Claims, 9 Drawing Sheets

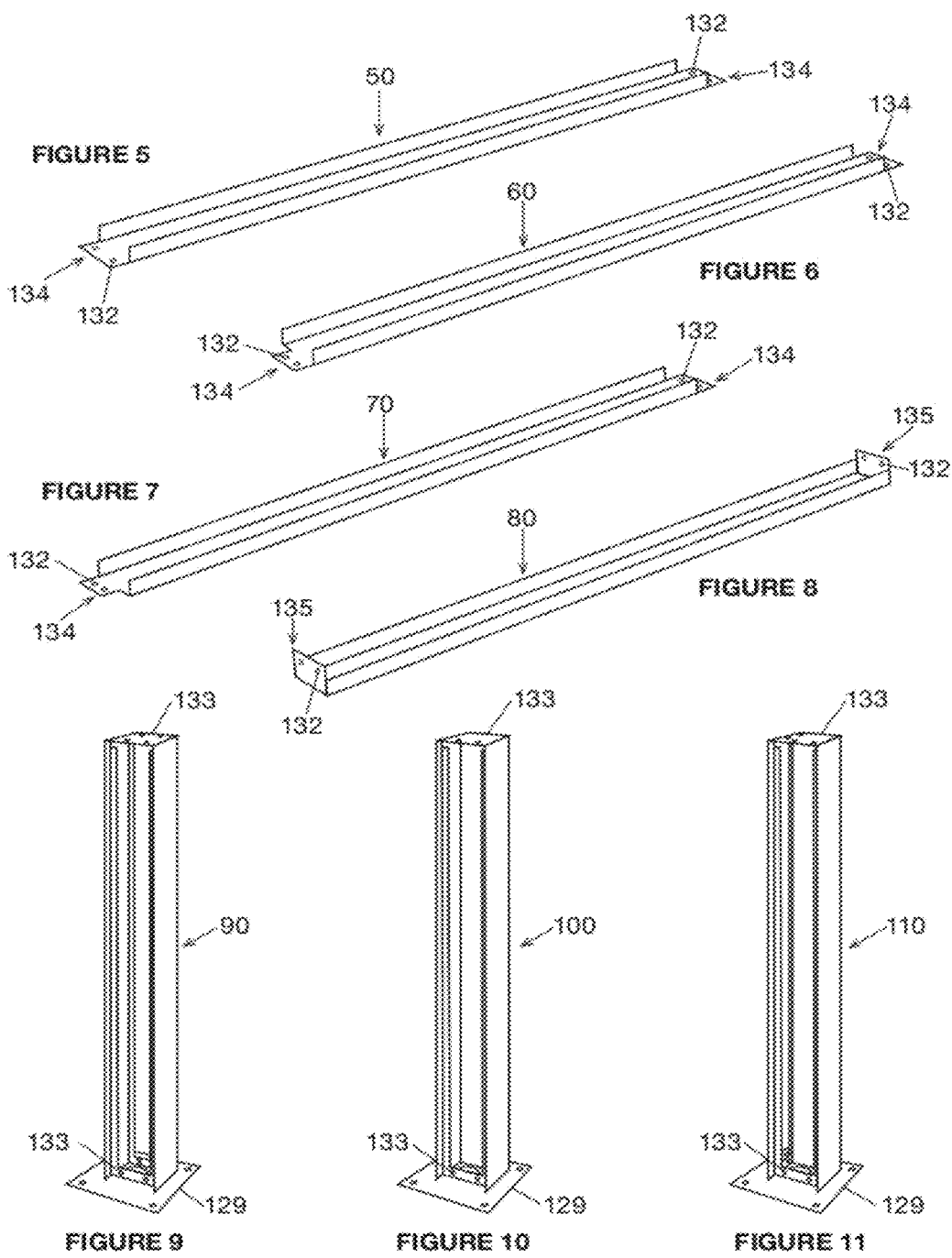

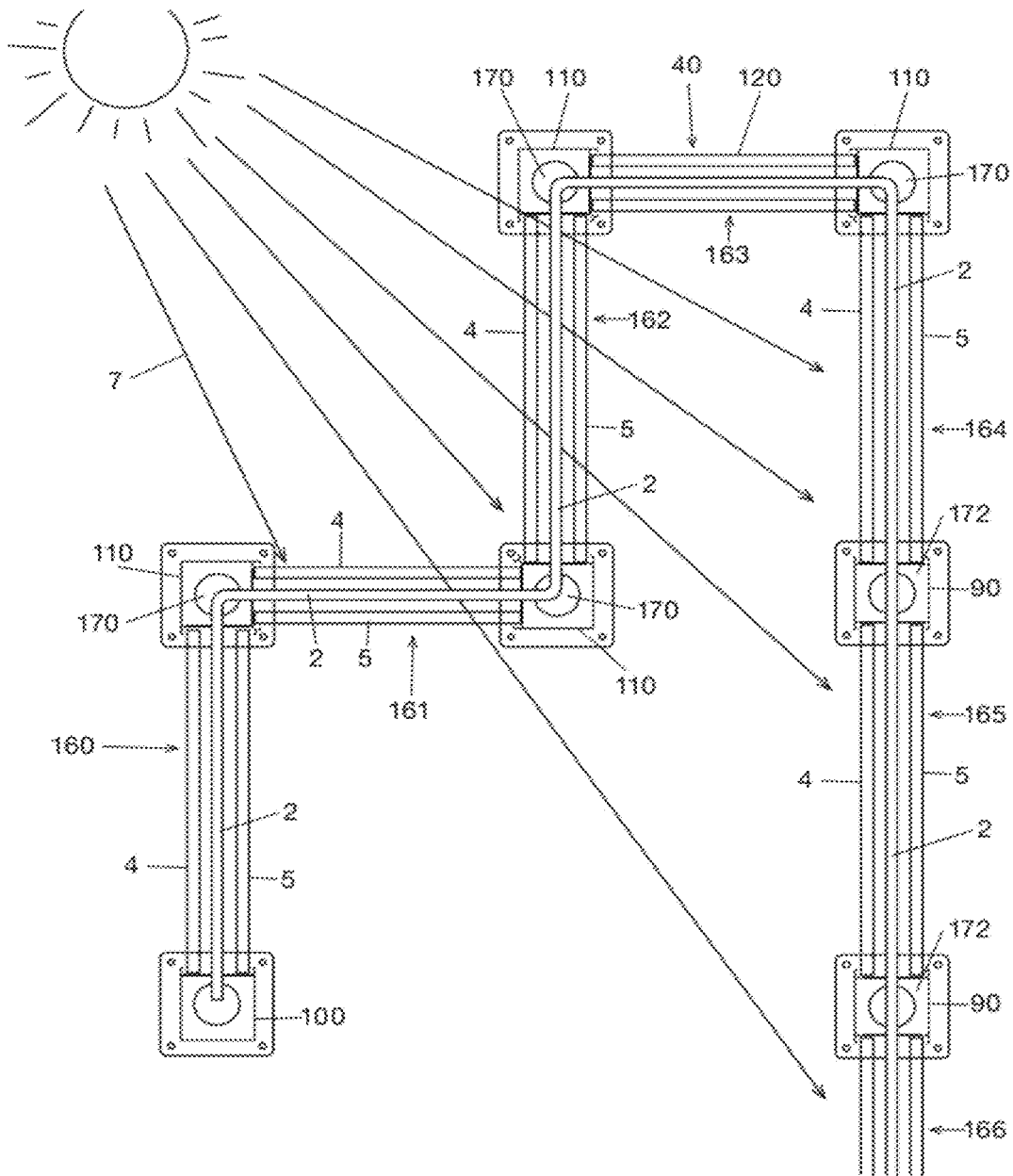

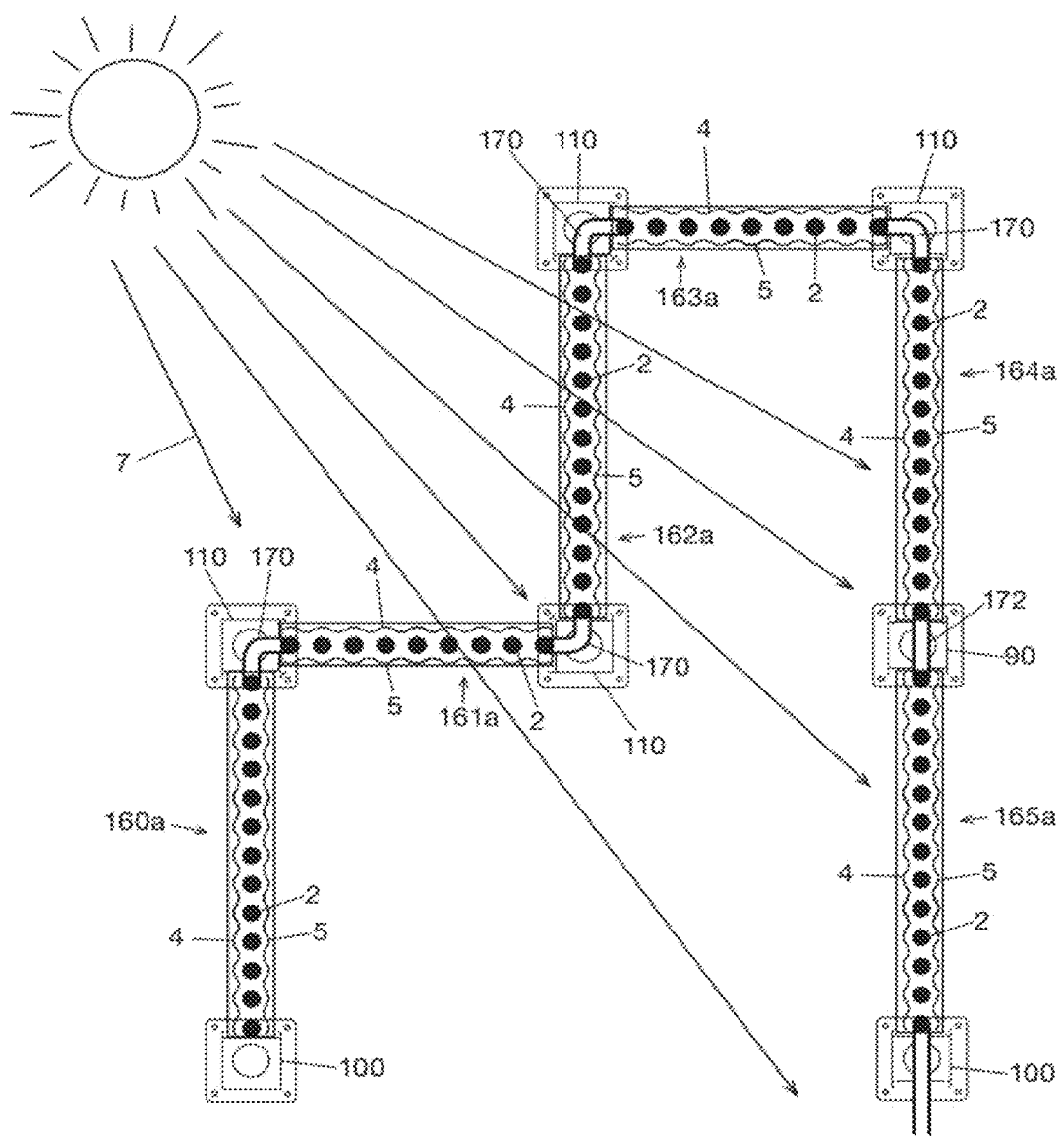

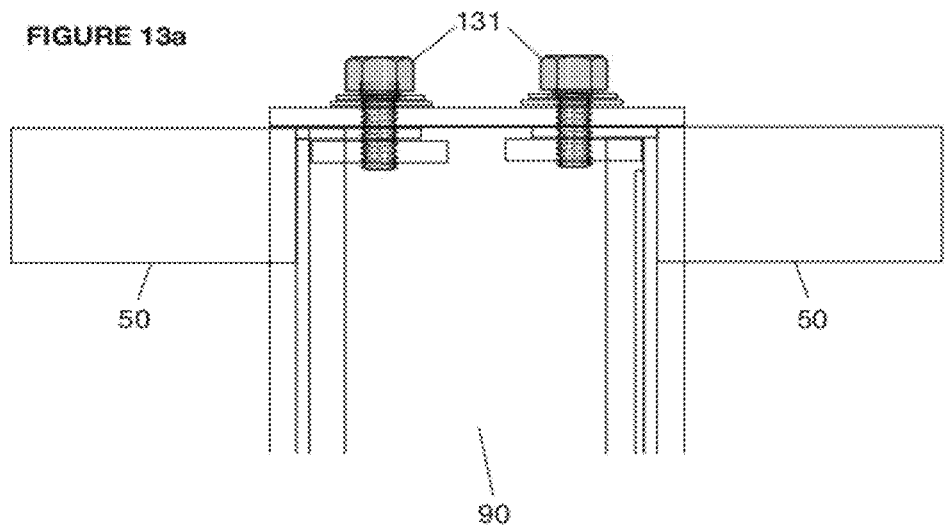
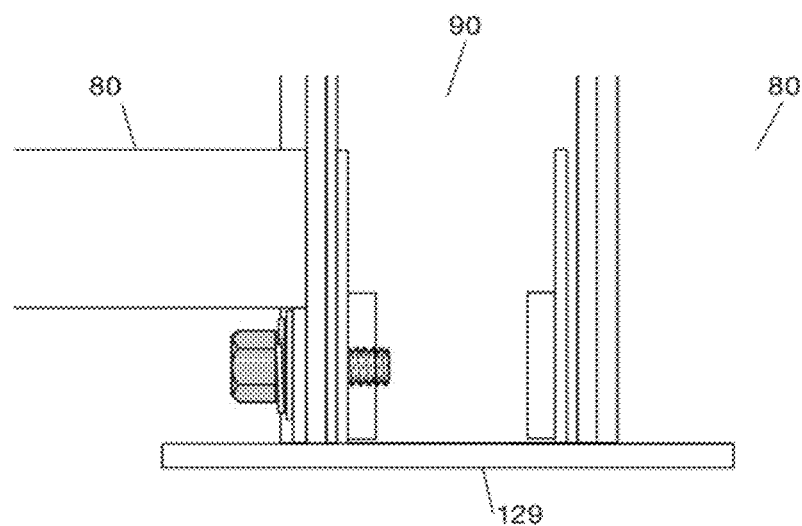

SOLAR FLUID HEATER AND APPLICATIONS FOR THE SAME

RELATED APPLICATIONS

The present application claims priority from U.S. Provisional Patent Application entitled Improved Solar Water Heater And Applications For The Same, Ser. No. 61/119,013, which was filed on Dec. 1, 2008, of common ownership, and which application is hereby incorporated herein by reference.

FIELD OF THE INVENTION

This invention relates to solar powered fluid heating and to applications of solar powered fluid heating, including outdoor showers and provision of substantially continuous supplies of warm or hot fluid heated by the sun.

BACKGROUND OF THE INVENTION

The demand for energy is forever on the rise, and the traditional fossil fuel resources that provide it are of a finite supply. Also, the burning of such fuels contributes to atmospheric pollution and leads to the production of carbon dioxide, which is suspected to accelerate the greenhouse effect and lead to global warming or climate change. Sun as an energy source is inexhaustible and is becoming increasingly popular due to its cleanliness and availability.

In some settings it may be particularly advantageous to use solar energy to heat water supplies. For example, at holiday (vacation) homes or resorts, people often wish to have a shower or wash, for example after swimming in the sea, lake or swimming pool. Such locations often have excellent supplies of solar energy. In the case of holiday homes or remote resorts, it may be particularly desirable to reduce reliance on main grid or generator supplied electricity for hot water heating. Another example would be for uses such as medical and communal facilities in remote and developing communities.

Some basic solar powered showers are known. One very basic type of solar-heated shower takes the form of a plastic bladder, which may be black on one side and transparent or translucent on the other, and supplied with an inlet and an outlet hose having a manually operated valve and shower head. In use, the bladder is filled with water and laid in the sun. Solar energy heats the water. When a user desires a shower, the bladder is suspended at a suitable height. By opening the outlet valve, the heated water is released by the effect of gravity for showering. These constructions suffer from the disadvantage that they have to be manually filled, laid out for a predetermined time to heat, and hung up to use. They are heavy and awkward to handle when full, especially by children. They have a very limited capacity, determined by the weight which can readily be lifted. Also, it is difficult to tell how hot the water has become, and there is therefore a risk of scalding when the valve is opened. The bladder is vulnerable to puncture, and the showers are aesthetically unattractive.

A large number of solar heating arrangements, both proposed and in-use today, incorporate mechanisms for solar heating water into panels. Many commercial solar heaters exist which may be installed on house roofs for example. Freestanding or fence-style panels are also known. U.S. Pat. No. 4,164,933 entitled CONCRETE SOLAR COLLECTORS to Alosi, the teachings of which are incorporated by reference by way of further background, proposes a concrete solar collector panel. The panel is developed with passageways which serve as a conduit for conveying a fluid. By constructing the panel as a structural member, a plurality of panels can be employed as a fence to receive radiant energy from the sun and transfer the collected heat to the fluid flowing within each of the panels. U.S. Pat. No. 4,280,477 entitled COMBINATION FENCE AND SOLAR HEATER FOR SWIMMING POOLS to Divine, the teachings of which are incorporated by reference by way of further background, proposes a combination fence and solar heater for swimming pools. A tubular heat exchanger is formed in at least one section of the fence and includes an exterior surface adapted to absorb solar energy which communicates with the water in the swimming pool. A pump flows the water in the swimming pool through the heat exchanger fence sections during daylight to heat the pool water. Also, U.S. Pat. No. 4,562,884 entitled HEAT-EXCHANGER ARRANGEMENT to Gebrider Uhl, the teachings of which are also incorporated by reference by way of further background, proposes a solar heat absorber including a plurality of heat exchange elements which are provided with external fins and have internal flow through passages for fluid. The passages communicate with internal channels of collector pipes. The collector pipes are in turn connected by respective corner members to connecting pipes to form a frame. A plurality of such frames can be arranged next to one another to form a fence with heat exchanging capability. In addition, U.S. Pat. No. 5,572,988 entitled SOLAR ABSORBER ASSEMBLIES to Neumann Steel Pty Ltd, also incorporated herein by reference by way of further background, proposes a solar absorber assembly having connectors between which tubes extend for conveying water to be heated. The tubes are surrounded by a glazing assembly which is supported by the connectors. The connectors may be connected with adjacent connectors of adjacent assemblies to form a fence panel.

However, all of these proposals for harnessing energy from the sun are relatively inefficient, in particular because only the surfaces that face the sun at a particular time are heated. It is therefore desirable to provide a solar water heating assembly which overcomes at least some of the disadvantages of the above-described prior art, generally increasing heating efficiency with a system that is easy and convenient to use, does not require major structural changes/additions to a building, provides a large volume of heated water and is aesthetically pleasing.

SUMMARY OF THE INVENTION

This invention overcomes the disadvantages of the prior art by providing a solar fluid heating assembly that generally increases the efficiency of the solar fluid heating assembly by reflecting the sun's energy onto heat generating surfaces that face away from the sun. It also provides an aesthetic structure that is readily installed in a variety of outdoor settings and can be used as a boundary fence in certain applications. In an illustrative embodiment, the solar heater comprises one or more conduits and a reflective mechanism, such that in use, heat energy falls substantially directly onto a front surface of the conduit, thereby heating fluid within the conduit, and heat energy is reflected by the reflective mechanism onto another surface of the conduit, thereby further heating the fluid within the conduit. In an illustrative embodiment, a solar fluid heating assembly is provided comprising one or more conduits sandwiched between a first and a second panel, wherein at least one outwardly facing portion of the first panel is substantially transparent to solar heat energy passing therethrough in the direction of the conduits and at least one portion, typically an inner surface, of the second panel orientated towards the conduits is substantially reflective of solar heat energy.

In an illustrative embodiment, at least the second panel is curved or most typically corrugated. The assembly is also illustratively provided with a fluid inlet and a fluid outlet, and the conduit forms a channel for fluid flowing therebetween.

In an illustrative embodiment a solar heated shower is provided comprising a fluid inlet, a system of one or more conduits for fluid connected to the inlet, the one or more conduits being sandwiched between a first and a second panel, and an outlet for fluid which has passed through the one or more conduits, wherein at least one outwardly facing portion of the first panel is substantially transparent to solar heat energy passing therethrough in the direction of the conduits and at least one inner surface portion of the second panel orientated towards the conduits is substantially reflective of solar heat energy. Illustratively, a water mixing mechanism is provided whereby additional cold water can be added to water which has passed through the heating conduits, prior to or contemporaneously with release of water through the outlet.

In another illustrative embodiment, a solar fluid heating fence assembly is provided, comprising a solar fluid heating assembly which comprises one or more conduits sandwiched between a first and a second panel, wherein at least one outwardly facing portion of the first panel is substantially transparent to solar heat energy passing therethrough in the direction of the conduits and at least one portion, preferably an inner surface, of the second panel oriented toward the conduits is substantially reflective of solar heat energy, and wherein the assembly is supported by a framing mechanism suitable for erection as a fence structure.

BRIEF DESCRIPTION OF THE DRAWINGS

The invention description below refers to the accompanying drawings, of which:

FIG. 5 is a perspective view of a top-middle framing component for use in a solar fluid heating fence assembly according to an illustrative embodiment of the invention;

FIG. 6 is a perspective view of a top-left corner framing component for use in a solar fluid heating fence assembly according to an illustrative embodiment of the invention;

FIG. 7 is a perspective view of a top-right corner framing component for use in a solar fluid heating fence assembly according to an illustrative embodiment of the invention;

FIG. 8 is a perspective view of a bottom framing component for use in a solar fluid heating fence assembly according to an illustrative embodiment of the invention;

FIG. 9 is a perspective view of a middle side framing component for use in a solar fluid heating fence assembly according to an illustrative embodiment of the invention;

FIG. 10 is a perspective view of an end side framing component for use in a solar fluid heating fence assembly according to an illustrative embodiment of the invention;

FIG. 11 is a perspective view of a corner side framing component for use in a solar fluid heating fence assembly according to an illustrative embodiment of the invention;

FIG. 12 is a plan view of an exemplary configuration of a solar fluid heating fence assembly according to an illustrative embodiment of the invention using the framing components of FIGS. 5-11;

FIG. 12a is a plan view of an exemplary configuration of a solar fluid heating fence assembly according to another illustrative embodiment of the invention using the framing components of FIGS. 5-11;

FIG. 13a is a side cross-section of a top fastening of framing components for a solar fluid heating assembly in accordance with illustrative embodiments of the invention; and FIG. 13b is a side cross-section of a bottom fastening of framing components for a solar fluid heating assembly in accordance with illustrative embodiments of the invention.

DETAILED DESCRIPTION

Figure 1A:
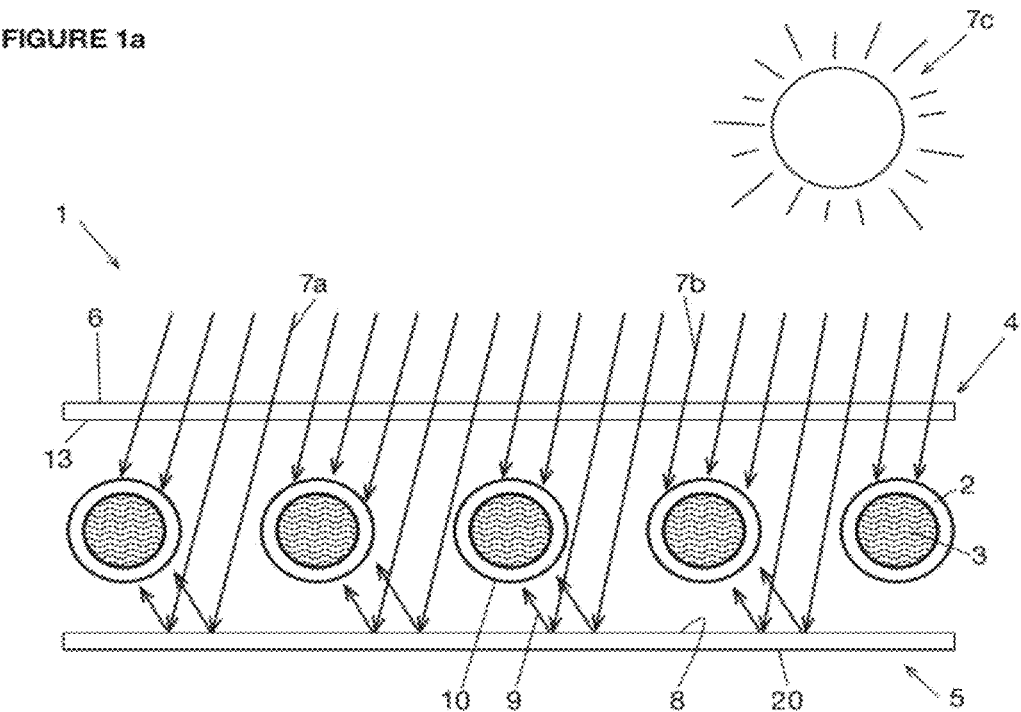
FIG. 1a is a schematic cross section of a solar fluid heating assembly according to an illustrative embodiment featuring flat, planar panels which illustrates the passage of solar heat energy therethrough.

Referring to FIG. 1a, in a first illustrative embodiment of the invention a solar fluid heating assembly 1 is provided comprising one or more conduits 2, which illustratively contain fluid 3, the conduits 2 being sandwiched between a first panel 4 and a second panel 5, wherein at least one outwardly facing portion 6 of the first panel 4 is substantially transparent to solar heat energy (arrows 7a), derived from the sun 7c, passing therethrough in the direction of the conduits 2 and at least one portion of the inner surface 8 of the second panel 5 orientated towards the conduits 2 is substantially reflective of solar heat energy (arrows 7b).

In use, according to illustrative embodiments, fluid 3 passing through (under flow pressure), or contained within, the conduits 2 is heated both by heat energy (arrows 7a) which passes through transparent panels 4 and directly strikes conduits 2 but also by heat energy (arrows 7b), which strikes the reflective surface 8 behind the conduits 2 and is reflected (arrows 9) back to the conduits 2 onto surfaces 10 that face away from the sun. Thus, the efficiency of heating is greatly enhanced. More generally, the conduits 2 may contain any fluid, such as any known liquid or gas capable of flowing through the conduits and capable of absorbing and transferring heat energy. The term "contain," as used herein (such as in the phrase "contain a fluid"), refers generally to defining the area where a fluid may flow, but, as would be apparent to those of skill in the art, the fluid may still enter and exit the conduits 2 through, e.g., inlets and outlets. Likewise, the term "fluid" should be taken broadly to include (but not be limited to) a number of different liquid compounds and combination of compounds, such as a water, a water-glycol mixture, hydrocarbons, glycerin, water, etc. Furthermore, in the illustrative embodiment described herein, the solar fluid heating assembly serves to heat water because this is one example of a useful application of this invention. The solar fluid heating assembly may also serve to heat other liquids or gases (fluids), however, where such applications are desirable.

The conduits can define an opaque (e.g. flat black) surface, or can be tinted black or even transparent in various embodiments. Likewise, in any of the embodiments herein, the inner surface 13, 8 of either (or both) respective panels 4, 5 can be coated entirely or partially with a reflective coating that enables the majority of the radiation to pass into the interior of the assembly, but enhances bounce-back from the inner surface (in the manner of a "one-way" mirror).

Although the first or front panel 4 may within the scope of the invention be omitted, it is desirable to provide such a panel as it offers protection from wind-chill and other weather-related elements. The chilling effect of air movement across conduits 2 can significantly reduce the efficiency of solar heating. First panel 4 can also be protective against impact damage to the conduits, and can improve the aesthetic appearance of the overall heater assembly according to the various embodiments herein.

The panels 4 and 5 may be of any suitable shape. In FIG. 1a second panel 5 is flat. Since even if the assembly 1, as is highly desirable, is installed so as to receive a maximum amount of sunlight on first panel 4, the rays will rarely be exactly perpendicular to the plane of the panel, and the flat, second panel 5 will still reflect some heat radiation (arrows 9) onto the conduits 2, as shown in FIG. 1a. The panels 4 and 5 can be parallel to each other, as illustrated in FIG. 1a, or they can be situated in intersecting planes (i.e., non-parallel) in alternate embodiments. For example, in an alternate embodiment, the conduit can taper into a narrower width near one edge of the panels, illustratively to affect the pressure level of the fluid near an outlet, and the panels in this embodiment may be mounted in a non-parallel fashion such that the distance between them likewise decreases to match the narrowing of the conduit.

Figure 1B:
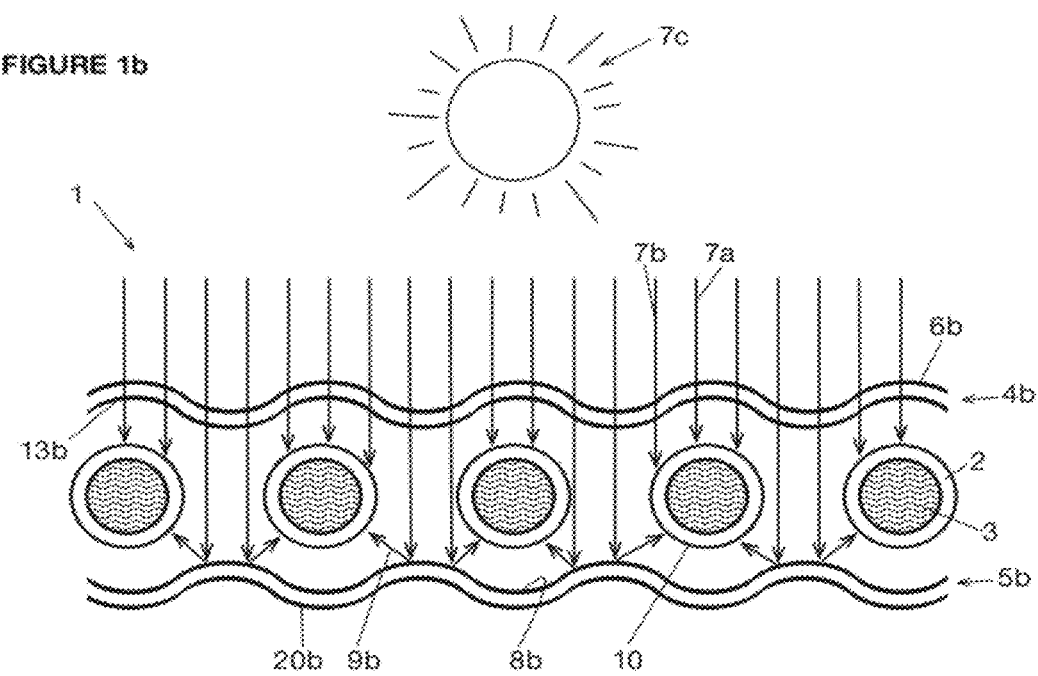
FIG. 1b is a schematic cross section of a solar fluid heating assembly according to one illustrative embodiment featuring corrugated panels which illustrates the passage of solar heat energy therethrough.

In at least one illustrative embodiment of the fluid heating assembly 1b, the second (rear) panel 5b defines a curved, or desirably, corrugated surface shape as shown in the cross section of FIG. 1b. The curved or corrugated surface shape of the rear panel 5b allows for the heat generating rays (arrows 7a and 7b) to be particularly efficiently reflected (arrows 9b) at a range of angles including onto the back 10 of the fluid-carrying conduits 2, and may also at least partially compensate for variations in the angle of incoming heat radiation (arrows 7a, 7b) caused by the sun's movement during the day. Note that the first or front panel 4b also defines a curved or corrugated shape along its front surface 6b and inner surface 13b in this embodiment. In alternate embodiments, particularly where the sun tends to strike mainly on one panel side, only the rear panel is curved or corrugated. Moreover, angular facets can be employed on one or both panels in alternate embodiments. As a further alternate embodiment, the front and rear panels can define different shapes (e.g. one being curved and the other being corrugated, one being faceted and the other flat, or the corrugations/facets having differing pitch/spacing on different sides). Likewise, the corrugations, facets or other repeating surface features can vary in pitch/spacing at differing points long the surface so that certain angles of incident sunlight are reflected to differing degrees along the panel.

As a result of the reflection offered by second panel 5 or 5b, the illustrative embodiments effectively convert those back surfaces 10 of the fluid-carrying conduits 2 that face away from the sun from being dormant to being heat generating. This has the benefit of bringing a clean and free natural energy generating resource into a more efficient, and therefore more competitive, position against some polluting and expensive energy options currently available.

As described generally above, the heat transparency and heat reflective properties of the panels 4, 4b and 5, 5b may be achieved in any suitable manner for example by coatings. A particularly illustrative material for the second panel 5, 5b is a coated acrylic such as that commercially available inter alia under the trade name PLEXIGLAS® HEATSTOP® available from Rohm GmbH & Co.KG of Germany. This material is normally used for roofing, skylights, awnings and the like with the coated surface orientated toward the sun. It comprises a 3 mm-thick single sheet of white, translucent material. In such applications the coating offers protection against heat as it reflects a substantial proportion, around 68%, of the sun's energy while being transparent to light. In the illustrative embodiments a coated acrylic can be used for at least second panel 5 with the heat-reflecting, coated surface 8 or 8b orientated toward the conduits 2. Preferably, the outer surface 20 of second panel 5 is substantially opaque. PLEXIGLAS® HEATSTOP® has such a translucent/visually obscuring outer surface. In use as a shower, this enables a fluid heating assembly to also offer privacy in the manner of a translucent shower door. It also allows for different colors for aesthetic/design/landscaping reasons. It should be clear however, that an alternate material with desirable transmission properties can be used as equivalent materials.

Transparent panel 4, 4b may be made of a transparent, uncoated PLEXIGLAS® sheet, or another suitable transparent material, including types of glass. In illustrative embodiments, the first panel 4 is made of a ultraviolet-rated (UV protecting) material, such as an acrylic sheet, which protects the conduits 2 from damage from UV radiation while allowing the passage of substantial amounts of heat radiation.

Figure 2:
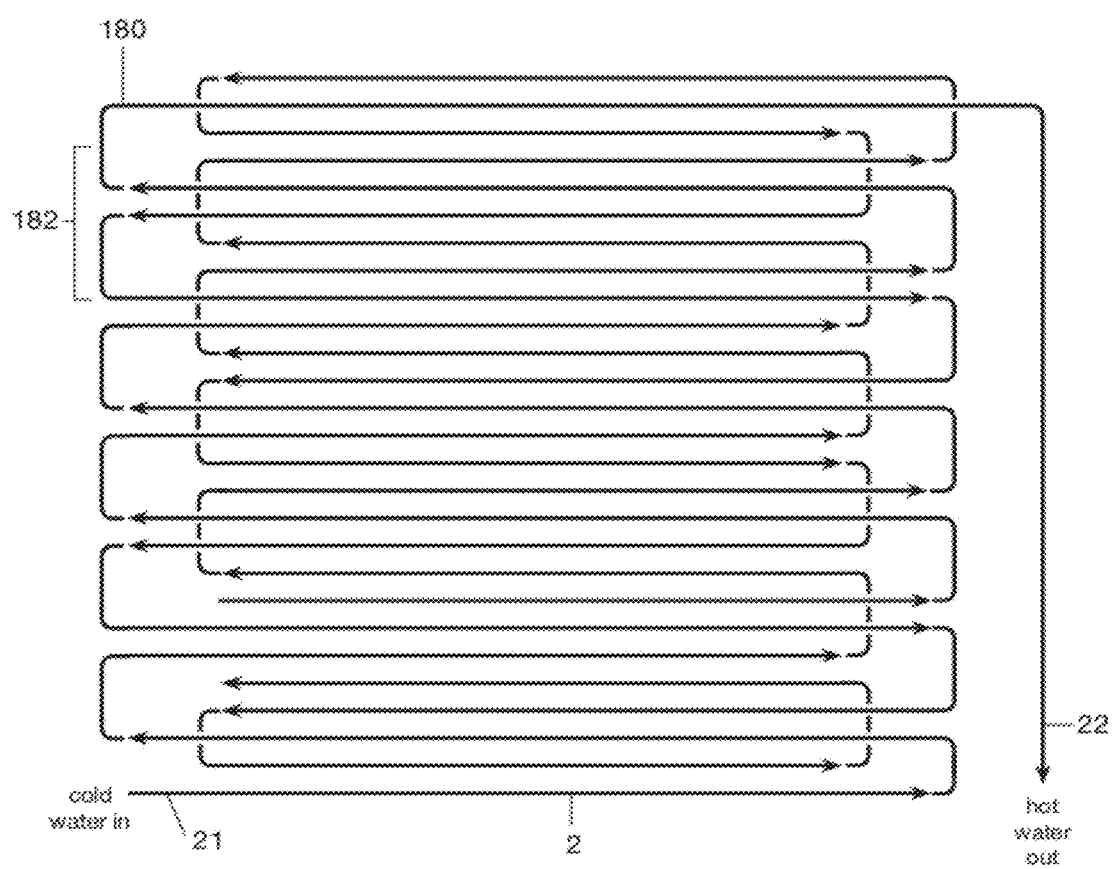
FIG. 2 is a front view of an illustrative arrangement of inlet, conduits and outlet for use in a solar fluid heating assembly according to various embodiments of the invention.
Figure 2A:
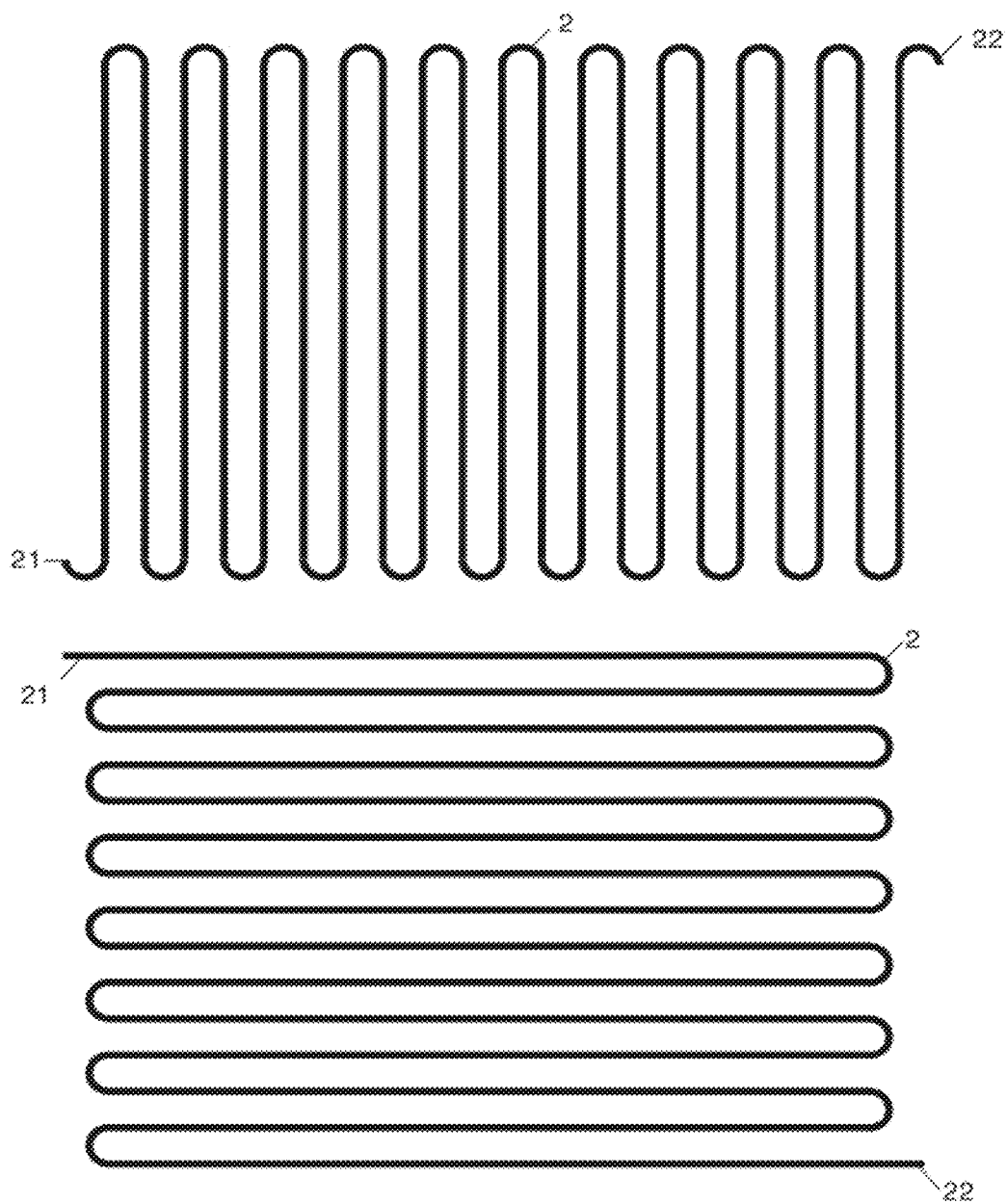
FIG. 2a is a front view of two illustrative arrangements of continuous conduits for use in a solar fluid heating assembly according to various embodiments of the invention.

FIG. 2 shows one possible efficient system and arrangement of fluid-containing conduits 2, together with a cold fluid inlet 21 and outlet 22 for heated fluid. The sinusoidal (zigzag) conduit arrangement shown enables a large length to be incorporated into a compact panel, although other arrangements are also possible as will be apparent to the skilled reader, and these are also envisaged and incorporated within the scope of the invention. Generally, according to the illustrative embodiment depicted in FIG. 2, the pipe sections extend approximately horizontally as shown and are joined by opposing approximately vertical joint sections 180. These joint sections are located near sides of the framework that supports the assembly (described below). The joint sections 180 overlap a plurality of horizontal, parallel pipe sections 182 to provide a nested overall pipe arrangement as shown. In another embodiment, the conduit can be a single continuous pipe as depicted in FIG. 2a. Also as illustrated in FIG. 2a, the continuous pipe can be formed to include multiple parallel straight sections joined by curved sections, rather than the multiple separate segments of straight pipe joined by joint sections 180 depicted in FIG. 2. Moreover, the conduit can follow any course or pattern between the panels. For example, according to the two illustrative embodiments depicted in FIG. 2a, the parallel straight sections of continuous conduit can extend approximately vertically or horizontally. Other arrangements or patterns of conduit as would be apparent to those of ordinary skill in the art are expressly contemplated as within the scope of the invention. For example, as illustrated in FIG. 2, a variety of stacking, overlapping, and clustering techniques can be used to optimize the packing of pipe sections.

The inner and outer diameter of conduits utilized is highly variable depending upon the desired flow and system storage requirements. In an embodiment, the conduits 2 are constructed using polymer or metal pipe having a standard plumbing diameter DP of between ½ inch and 2 inch (¾ inch in an illustrative embodiment), and adjacent conduits being spaced apart by a pipe-center-to-pipe-center spacing between approximately 2-4 inches (1⅝ inch in an illustrative embodiment). These dimensions and parameters are highly variable in alternate embodiments. The opposing side edges of the conduits are spaced approximately 1 inch from the adjacent inner faces of the panels 4, 4b, 5, 5b. This spacing is highly variable in alternate embodiments. Moreover, although FIG. 1 illustrates an embodiment wherein the conduits 2 are conventional round pipes with a perpendicular cross-section resembling a circle, the conduits can be of any form capable of containing fluid. For example, the conduits can be narrow channels between two flat panels of glass, such that the perpendicular cross-sectional shape of each conduit resembles a rectangle.

Figure 3:
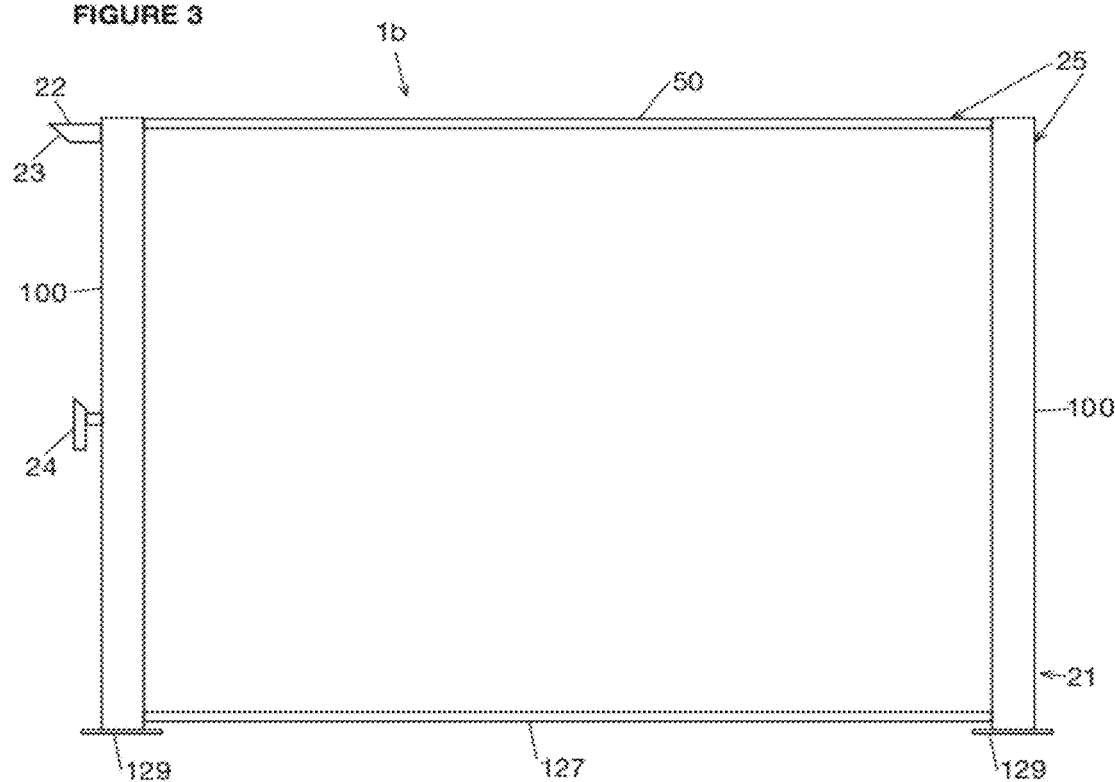
FIG. 3 is a front view of a solar heated shower according to an illustrative embodiment featuring heightened corrugated panel structure.

In an illustrative example of a solar heated shower embodiment, as shown in FIG. 3, an assembled fluid heater's (1b) inlet 21 is connected to a cold fluid supply, for example a garden hose, and an outlet 22, which in this embodiment is high up on the assembly, is provided with a shower head 23 and a tap or valve control 24 for operation by a user. Preferably a temperature-controlled or unregulated mixer mechanism, which can be a conventional design, is provided to allow cold fluid to be added to heated fluid before (or as) the fluid is released through the shower head. The selection and installation of such mixers for showers is known and should be apparent to those of ordinary skill.

The invention is suitable for production in a wide range of sizes. For a shower embodiment, a suitable size may be approximately 2.5 m/8 feet in overall width, by about 2.0 m/6.5 feet in overall height. The bottom edge 127 of the panel (1b) in this and other embodiments can be elevated at a spacing above a pair of footing plates 129 by a gap that can be approximately 1-6 inches. This gap is highly variable in alternate embodiments and allows both for drainage of the unit and isolation of its bottom from ground obstructions, uneven ground salt, moisture, rocks, etc. In strong sunlight, it has been observed that approximately 15 minutes of solar exposure and heating of a stationary charge of fluid in the pipes of the panel 1b will allow for about 10 minutes of showering with an approximate stored capacity of 5-8 gallons within the conduits 2. However, as noted above other sizes and volumes of panels, conduits, etc., are contemplated within the scope of the invention.

The solar heating assembly 1, 1b may preferably be supported by a framework 25 which can comprise a set of suitable framing members of construction grade aluminum or any other appropriate structural material (for example, another metal, such as steel, or a durable polymer, cementaceous material, or a composite).

FIGS. 5-11 show an illustrative embodiment of the components of a suitable framing system, comprising a straight length top channel 50 adapted to receive and retain the top edge of panels 4, 4b and 5, 5b, alternative top channels 60 and 70 adapted respectively for use at left and right corners, a bottom channel 80, a straight post 90, an end post 100 and a corner post 110. The end posts are adapted to allow conduit 2 to pass through between panel sections in the overall assembly. All of these parts can be adapted to bolt together on top and bottom as shown in FIGS. 13a & 13b using bolts 131 which are locatable through holes 132 in flanges 134, 135 projecting from channels 50, 60, 70, 80 and holes 133 in posts 90, 100, 110. The posts 90, 100, 110 shown have permanent footing plates 129 to attach to a desired permanent structure, such as a concrete footing or a cement slab with appropriate anchor bolts. The assembled framework should be strong enough to retain the panels, the conduits, and a full charge of fluid in an upright position as should be clear to those skilled in the art. In use, the assembly is installed at an orientation to allow maximum solar radiation to fall on the transparent panel face within the prevailing limitations of the site.

Figure 4:
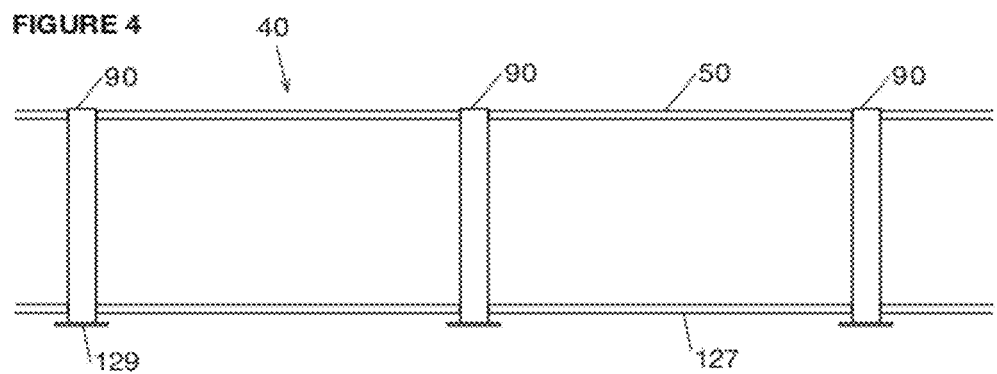
FIG. 4 is a front view of part of a solar fluid heating fence assembly according to another illustrative embodiment of the invention.
Figure 4A:
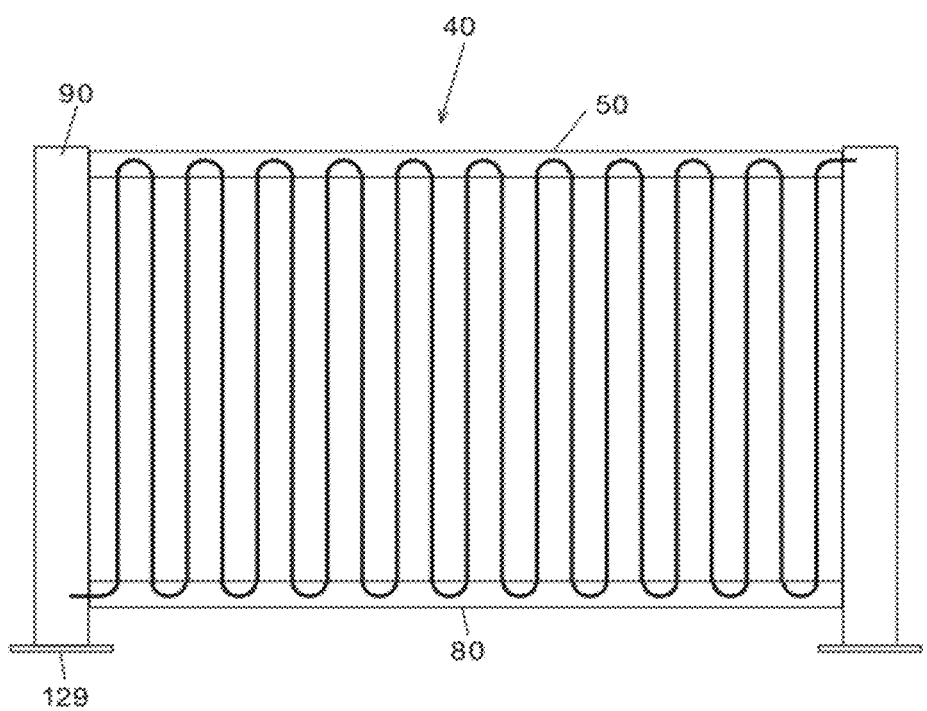
FIG. 4a is a front view of part of a solar fluid heating fence assembly according to another illustrative embodiment of the invention.

A further embodiment of the invention is the construction of a fence assembly 40 as shown in FIG. 4 wherein panels 4 (or 4b) and 5 (or 5b) and enclosed conduits 2 are supported by straight posts 90 and channels 50, 80 over a length and height suitable, for example, for swimming pool fencing. This system can be used to supply larger quantities of heated fluid, for example to heat a swimming pool or provide heated fluid into a domestic dwelling. A circulator pump, interconnected with the pool can be used to cycle fluid through the portions of the assembly. The conduits 2 illustrated in FIG. 4 are arranged in pipe sections that extend approximately horizontally and are joined by opposing approximately vertical joint sections 180, as described previously in reference to FIG. 2. In another embodiment, the conduit 2 in each section of the fence assembly 40 can be a single continuous pipe, as described previously in reference to FIG. 2a. Also as described above in reference to FIG. 2a, the conduit 2 is formed to include multiple parallel straight vertical portions joined by curved portions, as depicted in FIG. 4a.

FIG. 12 shows how a fence assembly 40 in accordance with the invention may be arranged in a variety of configurations, with the conduits 2 running continuously throughout the fence via straight posts 90 and corner posts 110. A series of panels 160, 161, 162, 163, 164, 165 and 166 are thus interconnected to define a continuous run of heating units, each defining an individual module in the overall configuration. The horizontal length (and/or vertical height) of various sections can be customized, or provided in one or more standard measurements. Inlets and outlets can be positioned so that they are vertically and horizontally aligned with each other, or connecting conduit pieces can be incorporated into the posts. The corner posts 110 can be adapted to allow the fence assembly 40 to follow any non-linear path. For example, the corner posts 110 may define right-angle turns, as depicted in FIG. 12. Alternatively, each corner post can define a turn having any non-linear angle. Thus, any two sections of the fence assembly 40 may be interconnected at a linear angle with respect to each other (such as panels 165 and 166 in FIG. 12) or they may be interconnected at a non-linear angle with respect to each other (like panels 160 and 161). The overall effect is to provide a highly versatile modular construction system that is straightforward to install and cost-effective to manufacture. As depicted in FIG. 12, pipe connectors 170 and 172 (shown in phantom) join respective corners and straight sections, running through the posts between the opposing inlets and outlets in each panel section The fence assembly allows for any combination of parts shown in FIGS. 5-11 to be constructed to any desired layout, one example of which is shown in FIG. 12.

As shown further in FIG. 12, the panels 4 (or 4b) and 5 (or 5b) may preferably be positioned on differently angled portions of such a fence assembly 40 so as to maximize the amount of solar radiation falling on first panel 4, taking into account the prevailing angle of the sun in the particular geographical location. If desired, the conduits 2 may bypass or bridge substantially straight through those areas of the fence configuration, such as portion 120, that are substantially not exposed to direct sunlight, rather than pursuing a sinusoidal path such as shown in FIG. 2, therefore not compromising the fluid-heating efficiency. In general, it is contemplated that some panels—particularly those in shady areas or facing askew to prevailing sunlight—can be "dummy" panel sections with no conduits or the single bridging conduit with appropriate thermal insulation thereon. These dummy panel sections can have an outward appearance similar or identical to the operative panel sections.

The conduits 2 illustrated in FIG. 12 are arranged in pipe sections that extend approximately horizontally, as described previously in reference to FIG. 2. In another embodiment, however, the conduit 2 in each section of the fence assembly 40 can be formed to include multiple parallel straight vertical sections, described above in reference to FIGS. 2a and 4a. This embodiment, including vertical sections of conduit, is depicted in FIG. 12a. FIG. 12a also illustrates an embodiment where both panels 4 and 5 have a corrugated surface. Although FIG. 12a depicts the panels 4 and 5 being corrugated such that the crests and grooves of the corrugation are aligned with the vertical sections of conduit 2, it is expressly contemplated that the surfaces of the panels may be corrugated along any axis or arbitrary direction along the surfaces of the panels, and this direction of corrugation is not necessarily limited by the orientation of the parallel sections of the conduit 2. Similarly, the frequency of the crests and grooves of the corrugation is not limited to the frequency at which the conduit 2 alternates direction. FIG. 12a merely illustrates one desirable arrangement where the conduit 2 forms parallel straight vertical sections and where the direction and frequency of the corrugation of the panels 4 and 5 align with the orientation and frequency of the parallel sections of the conduit 2.

To again summarize, the various embodiments of this invention provide a solar fluid heating assembly (which is a standalone unit or part of an interconnected assembly, such as a fence) that includes a continuous conduit 2 sandwiched between a first solar-radiation-transmitting panel 4 (4b) and a second solar-radiation-transmitting panel 5 (5b). Illustratively, the conduit 2 extends in parallel pipe sections approximately horizontally between opposing sides of the enclosing framework in a sinusoidal pattern with approximately vertical joints (180 in FIG. 2) therebetween. The conduits may thereby define an array of approximately parallel pipe sections oriented to best receive both solar radiation directly transmitted through the first panel 4 (4b) along a side of the conduit facing that first panel 4 (4b) and solar radiation reflected off the interior surface 8 of the second panel 5 (5b) along a side of the conduit facing that second panel 5 (5b).

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, while panel sections and fences having linear plan view shapes and linear or perpendicular joint connections at corners. It is expressly contemplated that panel sections can have segmented, polygonal or curvilinear plan view shapes and that posts can allow interconnection of panel sections at non-perpendicular orientations with respect to each other—thereby allowing complex curved or polygonal layouts to be generated. Likewise, terms such as "top", "bottom", "side", "vertical", and "horizontal", should be taken as conventions with respect to the geometry of the illustrative embodiments. In general, wherein the foregoing reference has been made to integers or components having known equivalents, then such equivalents are herein incorporated as if individually set forth. Accordingly, this description is meant to be taken only by way of example, and not to otherwise limit the scope of this invention.

What is claimed is:

1. A solar fluid heating assembly comprising:
a first panel section constructed from a first solar-radiation-transmitting panel and a second solar-radiation-transmitting panel, which are joined together by a first ground post and a second ground post,
wherein the first ground post joins a first edge of the first solar-radiation-transmitting panel and a first edge of the second solar-radiation-transmitting panel and the second ground post joins a second edge of the first solar-radiation-transmitting panel and a second edge of the second solar-radiation-transmitting panel, so that the first solar-radiation-transmitting panel and the second solar-radiation-transmitting panel are secured approximately parallel to one another;
a second panel section constructed from a third solar-radiation-transmitting panel and a fourth solar-radiation transmitting panel, which are joined together by a third ground post on a first edge of the third solar-radiation-transmitting panel and a first edge of the fourth-solar-radiation-transmitting panel, and
wherein the second panel section is interconnected to the first panel section by one of the first ground post and the second ground post at a second edge of the third solar-radiation-transmitting panel and a second edge of the fourth solar-radiation-transmitting panel; and
a first conduit sandwiched between each of (a) the first solar-radiation-transmitting panel and the second solar-radiation-transmitting panel, and (b) the third solar-radiation-transmitting panel and the fourth solar-radiation-transmitting panel, the first conduit comprising a single continuous section of pipe oriented to pass from the first panel section to the second panel section and to define a continuous, serpentine path within each of the first panel section and the section panel section,
wherein the first solar-radiation-transmitting panel and third solar-radiation-transmitting panel are each oriented to receive solar radiation therethrough and onto a first surface of the first conduit, and
wherein the second solar-radiation-transmitting panel and the fourth solar-radiation-transmitting panel are each constructed and arranged to reflect at least a portion of the received solar radiation toward a second surface of the first conduit, and wherein the first conduit is adapted to contain a fluid capable of absorbing heat energy from the received solar radiation.

2. The solar fluid heating assembly as set forth in claim 1 wherein the first conduit extends in parallel pipe sections horizontally between opposing sides of the first panel section in a sinusoidal pattern with approximately vertical joints therebetween.

3. The solar fluid heating assembly as set forth in claim 2 wherein the first conduit is formed to include multiple straight parallel portions joined by curved portions.

4. The solar fluid heating assembly as set forth in claim 3 wherein the multiple straight parallel portions of the first conduit extend vertically between a top and a bottom of the framework.

5. The solar fluid heating assembly as set forth in claim 1 wherein the first conduit comprises a pipe with a circular cross-section taken along a plane perpendicular to a direction of flow therethrough.

6. The solar fluid heating assembly as set forth in claim 1 wherein the first solar-radiation-transmitting panel is parallel to the second solar-radiation-transmitting panel when both solar-radiation-transmitting panels are supported by the first panel section.

7. The solar fluid heating assembly as set forth in claim 1 wherein at least one of the first solar-radiation-transmitting panel and the second solar-radiation-transmitting panel defines a curved or corrugated surface shape.

8. The solar fluid heating assembly as set forth in claim 1 wherein at least the second solar-radiation-transmitting panel includes a reflective coating along an inner surface thereof.

9. The solar fluid heating assembly as set forth in claim 1 wherein the first solar-radiation-transmitting panel comprises UV-protecting material.

10. The solar fluid heating assembly as set forth in claim 1 wherein the fluid comprises water.

11. The solar fluid heating assembly as set forth in claim 10 further comprising:
    an inlet from a water source interconnected with a first end of the first conduit; and
    an outlet interconnected with a shower head and further interconnected with a second end of the first conduit.

12. The solar fluid heating assembly as set forth in claim 11 further comprising:
    a water mixing mechanism for adding additional water to water exiting the first conduit, wherein the water mixing mechanism is interconnected with the outlet, and wherein the additional water is colder than the water exiting the first conduit.

13. The solar fluid heating assembly as set forth in claim 1 wherein the fluid comprises water and wherein the first panel section and the second panel section collectively define at least part of a fence around a perimeter of a swimming pool and further comprising a circulator pump to cycle water from the pool through the first conduit.

14. The solar fluid heating assembly as set forth in claim 1 further comprising a third panel section, defining a dummy panel section, the third panel section being joined to one of the first panel section and the second panel section and having at least a portion of the first conduit passing therethrough from one of the first panel section and the second panel section respectively, and the third panel section including thermal insulation adjacent the first conduit.

* * * * *